UNITED STATES PATENT OFFICE.

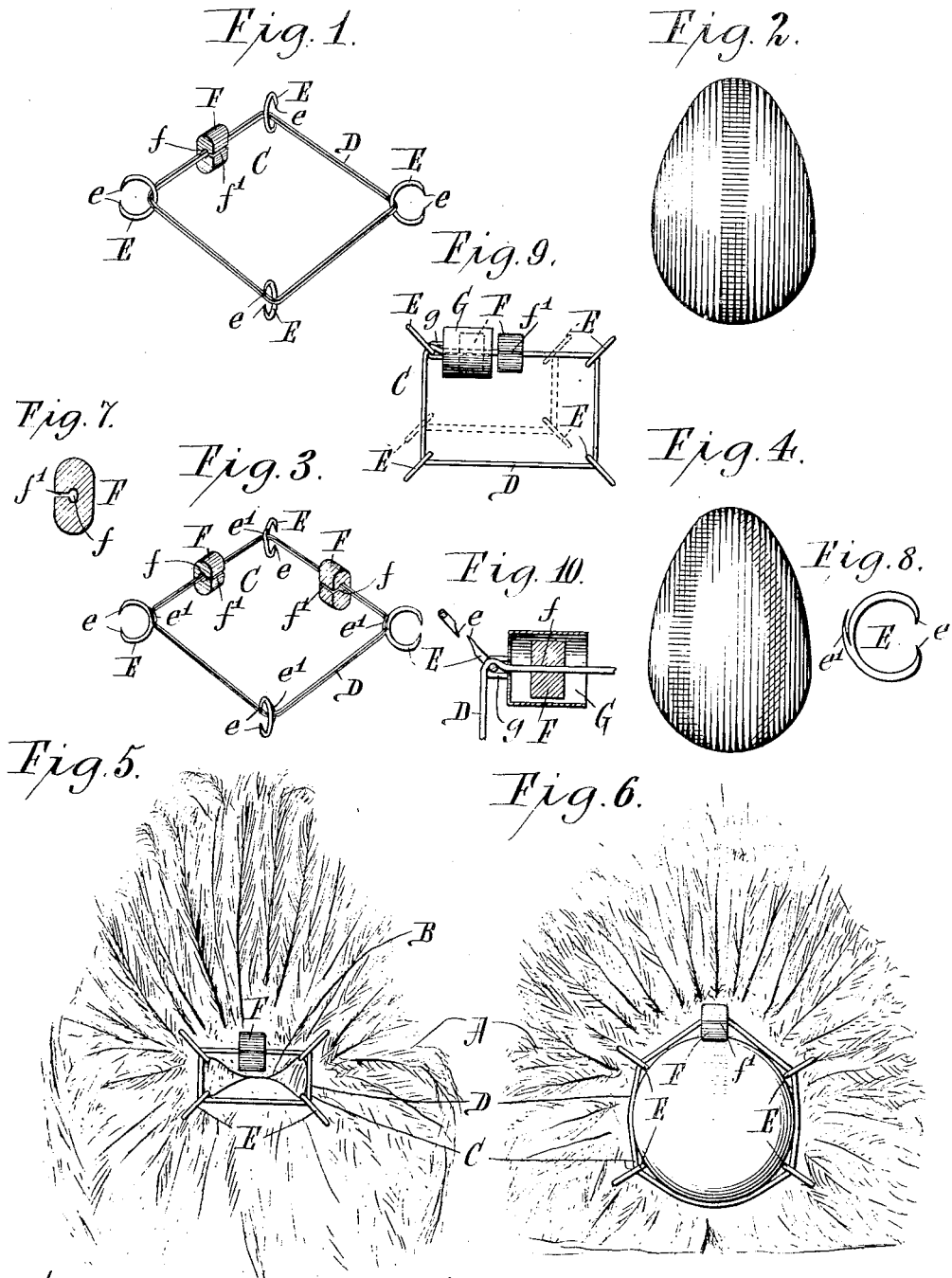

STANLEY A. MERKLEY, OF BUFFALO, NEW YORK.

EGG-MARKING DEVICE.

970,074.  Specification of Letters Patent.  Patented Sept. 13, 1910.

Application filed April 18, 1910. Serial No. 556,049.

*To all whom it may concern:*

Be it known that I, STANLEY A. MERKLEY, a citizen of the United States, residing at Buffalo, in the county of Erie and State of New York, have invented a new and useful Egg-Marking Device, of which the following is a specification.

My invention relates to a new and useful egg marking-device which is adapted to be attached to a hen to mark the eggs as they are being laid.

The primary object of my invention is the production of an egg marking-device bearing a marking-element or elements whereby the eggs laid by the hen to which the marking device is attached will be marked in a distinctive manner and whereby the laying capacities or qualities of each hen in a hennery can be easily ascertained.

Another object of my invention is the provision of a marking-device of this character which can be easily attached to the vent of a hen so that it will always be in place for marking an egg laid by said hen.

A further object of my invention is to so construct the marking-device that it will yield with the walls of the vent as the egg is being laid, thus permitting the egg to pass through the marking-device.

Still further objects are, to so construct the marking-device that the marking-element can be placed at different points or so that two or more marking-elements may be used and placed relatively in different positions, said marking-elements being either the same or different colors, as may be desired, thus making it possible to use a large combination of marks so that all the hens of a large hennery can be equipped with such marking-devices and perfect assurance had that the eggs of each hen can be identified, it being of course necessary that each hen has a record with the particular identifying marks placed on the eggs noted on the record; to provide means for shielding or protecting the marking-elements when in normal position; and to provide other novel features to make the device effective and very desirable and to render it easy to be applied and removed.

To these ends my invention consists of a marking-device adapted to be applied to a hen to mark the eggs laid by the hen in a distinctive manner so that all eggs laid by said hen can be easily identified; and it further consists in the novel features and in the construction, arrangement and combination of parts to be hereinafter described and particularly pointed out in the subjoined claims.

In the drawings,—Figure 1 is a perspective view of a complete marking-device ready to be applied to a hen. Fig. 2 is a view of an egg showing the manner in which it is marked by the device shown in Fig. 1. Fig. 3 is a perspective view of the marking-device showing a different arrangement of marking-elements and a modified form of supporting-ring. Fig. 4 is a view of an egg showing the manner in which it is marked by the marking-device illustrated in Fig. 3. Fig. 5 is a view showing the manner in which the marking-device is attached to a hen, the device being in normal position. Fig. 6 is a similar view showing the marking-device expanded and an egg passing therethrough in its passage from the vent of the hen. Fig. 7 is a cross-section through one of the marking-elements. Fig. 8 is a view of a modified form of the securing-ring. Fig. 9 is a view of a marking-device provided with a shield or protector into which the marking-element is to be drawn when the device moves into normal position, as shown in dotted lines in said figure. Fig. 10 is an enlarged longitudinal section of a portion of the device showing the marking-element within the shield or protector.

Referring now to the drawings in detail, like letters of reference refer to like parts in the several figures.

In Figs. 5 and 6, A designates a hen, and B the vent thereof. The marking-device illustrated in all the figures is designated by the letter C and comprises an elastic supporting-band D secured in position around the vent of the hen by securing-rings E. There are preferably four of these securing-rings used for attaching the device to a hen, the attachment thereof being made in the bursa, or in other words, the securing rings are passed through the walls of the vent. These rings are open and pointed at the openings, as at e, so that with the use of a suitable tool they may be easily passed through the walls of the vent and thus support the elastic band in a position around the vent, as clearly shown in Fig. 5. The passing of the securing-rings through the walls of the vent does not in any manner injure or affect the hen, as this part of the hen is permanent cartilage, a texture or substance possessed of elasticity and flexibility and almost entirely devoid of blood.

The supporting-band D is preferably the ordinary commercial elastic band, and in Fig. 1 it is shown passed through the securing-ring, making it necessary therefore that this band be attached to the securing-rings preparatory to fastening the securing-rings in place. I prefer, however, that each securing-ring be provided with a hook $e^1$ formed by splitting the metal of the ring and forcing a part outward, as best shown in Fig. 8. When securing-rings of this type are used, the elastic band is hooked over the hooks thus formed, as shown in Fig. 3. This enables a new supporting- or elastic band to be placed in position, when needed, without removing the securing-rings from the walls of the vent as would be necessary if rings of the type shown in Fig. 1 are used.

While I have shown and described open securing-rings for fastening the marking-device in position, I do not wish to limit myself to the use of such securing-devices, as many other forms of securing-devices may be substituted therefor.

Marking-elements F are secured to the supporting-band in any suitable manner, but I preferably construct the marking-elements with central longitudinal openings $f$ and a narrow slot $f^1$ extending from said opening to the surface of the marking-element.

In order to place the marking-element on the supporting-ring, it is necessary to stretch the elastic band so as to reduce the diameter thereof sufficiently to pass through the slot $f^1$ and enter the longitudinal opening $f$. The band is then relieved of tension and fills the entire opening, thus securing the marking-element thereto by frictional contact.

In Fig. 1 I have shown a single marking-element which may be of any color and when the egg passes out of the vent, it distends the walls of the latter, causing the supporting-band C to expand, as clearly shown in Fig. 6, and as the egg passes through the supporting-band, the marking-element marks the egg lengthwise, as shown in Figs. 2 and 6.

By using four securing-rings, the supporting-band is normally rectangular, having four stretches or sides. In Fig. 1 the marking-element is shown attached to one side of the band, whereas in Fig. 3 there are two marking-elements shown attached to adjoining sides of the band. These marking elements may be of the same or different colors and distinctively mark an egg passing therethrough in the manner shown in Fig. 4. Any combination of colors may be used and two or more marking-elements may be used on one side of the supporting-band or they may be positioned relatively to each other in various other ways, thus enabling the eggs to be marked in a great many distinctive ways. These elements are preferably made of a composition non-effective by and insoluble in water so that the hens will be kept clean and cannot be smeared with color. I, however, provide a shield or protector in which the marking-element is confined when the supporting-band is in normal position, as shown in Fig. 9, thus preventing dirt or other matter adhering to the marking-element and rendering the same ineffective. This shield or protector is designated G and is made in the form of a casing closed at one end and open at the other, the closed end having an eye $g$ through which the adjacent securing-ring is passed, thus holding the shield in proper position to receive the marking-element.

When the egg is passed from the vent and through the supporting-band, said band is expanded, causing the marking element to be drawn out of the shield or protector, as best shown in Fig. 9, and as soon as the egg is laid, the walls of the vent return to normal position, as shown in Fig. 5, so that the supporting-band is relieved of tension and the marking-element enters the shield or protector.

The accompanying illustration of my invention is merely a representative one and many changes in form, construction, and arrangement may be resorted to without departing from the principle of my invention or sacrificing any of its advantages.

Having thus described my invention, what I claim is,—

1. The combination of an egg marking-element and means for attaching said marking-element to a hen.

2. The combination of an egg marking-element and an expansible supporting-element adapted to be attached to a hen in operative relation to the vent of the hen.

3. An egg marking-device adapted to be attached to a hen in operative relation to the vent thereof.

4. An egg marking-device adapted to be attached to a hen, comprising securing-means, a supporting-element, and a marking-element secured on said supporting-element.

5. An egg marking-device adapted to be attached to a hen, comprising a supporting-band, means for securing said supporting-band to the hen, and a marking-device carried by said supporting-band.

6. An egg-marking-device adapted to be attached to a hen, comprising an elastic supporting-band, means for securing said band in operative relation to the vent of the hen, and a marking-element removably held to said supporting-band.

7. In an egg marking-device for hens, the combination of an expansible supporting-band, securing-rings for securing said band to the hen in operative relation to the vent thereof, said supporting-band being expansible with the walls of said vent, and means on said band for marking an egg as it passes therethrough.

8. An egg marking-device for hens, comprising a supporting-band removably attached to the hen in operative relation to the vent thereof, and a marking-element carried by said band.

9. An egg marking-device for hens, comprising a plurality of securing-rings fastened to the hen, a supporting band removably held to said securing-rings, and a marking-element carried by said supporting-band.

10. An egg marking-device for hens, comprising a plurality of securing-rings having hooks and adapted to be fastened to the walls of the vent of the hen, an elastic-band removably held to said hooks, and a marking-element carried by said elastic band.

11. An egg marking-device for hens, comprising an elastic supporting-band, and a marker carried on said band, said marker having a central opening and a slot extending from said central opening and said band being passed through the slot of said marker and being frictionally held within said central opening.

12. The combination with an elastic supporting-band adapted to be attached to a hen in operative relation to the vent thereof, a marking-element carried by said band and movable lengthwise therewith, and a protector or casing through which said band is passed and in which the marking-element is normally held, said protector or casing permitting independent expansion of said supporting-band so as to move said marking-element out of said casing.

13. In an egg marking-device, the combination of an elastic supporting-band secured to a hen in operative relation to the vent thereof, a marking-element carried by said supporting-band, and a casing also carried by said supporting-band in which said marking-element is normally held.

14. In an egg marking-device, the combination of an elastic supporting-band, a marking-element secured to said supporting-band, and means to protect said marking-element when said securing-band is in normal position.

In testimony whereof, I have affixed my signature in the presence of two subscribing witnesses.

STANLEY A. MERKLEY.

Witnesses:
ELLA C. PLUECKHAHN,
CHRIST. FEINLE, Jr.